Patented Sept. 12, 1933

1,926,266

UNITED STATES PATENT OFFICE 1,926,266

ZINC PHOSPHATE MATERIAL AND METHOD OF MAKING SAME

Van M. Darsey, Morenci, Mich., assignor to Metal Finishing Research Corporation, Morenci, Mich., a corporation of Michigan No Drawing. Application February 7, 1931
Serial No. 514,323

5 Claims. (Cl. 23—105)

This application relates to a zinc phosphate material and a method of making the same. The purpose of the invention is to provide a zinc phosphate material which is uniform in composition and is composed of separate small crystals forming a granular mass easily handled and sufficiently stable for commercial purposes.

The material may be used to form and/or replenish rust-proofing solutions, or to form a plating solution, or for other purposes. It may be readily shipped where it is needed for use, and remains in an easily divisible and readily soluble form and of substantially constant composition.

The material is composed of zinc phosphate crystals of the orthorhombic form and having a chemical composition corresponding closely with the formula $Zn(H_2PO_4)_2 2H_2O$, or, expressed in another way, substantially $ZnO$ 27.5%, $P_2O_5$ 48.1%, $H_2O$ 24.4%. While the size of the crystals may vary somewhat, as will appear later, the preferred material is composed of crystals the great majority of which are between 16 mesh and 30 mesh. Smaller crystals are more apt to absorb moisture and to cake, while larger crystals are less quickly soluble.

The preferred method of making this material will be described, and then some possible variations of the method will be indicated.

A solution of zinc and phosphoric acid is formed, the dissolving being completed with the solution at a temperature of about 75° C. to 80° C. Since dissolving zinc in a solution of phosphoric acid results in considerable foaming, it is best to feed the zinc into the solution somewhat slowly. The supply of zinc is stopped when the zinc constitutes about 15% of the solution. When the zinc is all dissolved, the solution contains between 50% and 55% of phosphoric acid.

The solution formed as described is cooled down as rapidly as it conveniently may be to about 45° C., after which the cooling is continued slowly (it may be at the rate of 4° C. per hour) until the first signs of crystallization appear, which occurs at a temperature of from 32° C. to 34° C. Thereupon the cooling is stopped at once, and, as the crystallization proceeds, the heat of crystallization warms the solution about 10° C. before the process is completed. The solution is continually stirred during the crystallizing period. As soon as the temperature becomes constant, or tends to drop, the solution is again cooled for centrifuging. The solution, prepared in this way, may be piped readily, and the crystals may be fairly well dried in the centrifuge. It is then ready to pack.

The remaining mother liquor may then be used in forming a new solution, sufficient acid and zinc being added to bring the proportions to 15% zinc and 50% to 55% phosphoric acid, when the zinc is dissolved. The strength of phosphoric acid which is added to bring this result varies with the evaporation of the water occurring during the process, but in practice it is found that 75% acid may be used with only occasional correction to secure the right concentration of the resultant solution.

A solution may be made richer than 15% in zinc, especially if the concentration of acid at the completion of solution is allowed to run down; but the resulting crystallization is hard to control and forms a product which is difficult to handle satisfactorily in the centrifuge. If more than 17% of zinc is dissolved, it has been found almost impossible to separate a crystalline product, the result being a kind of paste, which retains much of the acid not utilized in dissolving the zinc.

Treatment, otherwise as described, of a solution containing 14% zinc, results in crystallization, but the crystals are so small that they cannot be readily separated from the mother liquor in a centrifuge.

Higher dissolving temperatures may be used, if desired, but are unnecessary and merely waste heat and prolong the cooling period.

If rapid cooling is continued below 45° C. to crystallization, or if cooling is continued after crystallizing is well under way, the phosphate forms crystals of the triclinic type, very fine and mostly short, so that a pasty mass results difficult to separate in a centrifuge and much more hygroscopic than the orthorhombic crystals, so that the product cannot be separated and retained as a dry, granular mass, and, even if dried initially, quickly absorbs water from the atmosphere until it is pasty.

Failure to stir during the crystallization, or too high zinc content, results in masses of coherent crystals from which the mother liquor cannot be separated readily, and which cannot be handled or dissolved as readily as the product resulting from the described process. The powdery or granular material described is preferable to a paste because it is easier to handle, easier to dissolve, is much more uniform as to composition, and contains the materials in about the proportions desired for rust-proofing and for plating purposes. It is fairly stable up to its melting point of 60° C., well above normal atmospheric temperature. Paste is likely to become liquid at a lower temperature, altho the actual melting point of the orthorhombic and triclinic crystals appears to be essentially the same.

While 15% zinc in the solution is preferred for reasons stated, a variation of little over 14% zinc with about 60% free acid to a little under 17% zinc with about 42% free acid can be used with some success.

When desired, a small amount of a material such as boric acid may be added to assist in retaining the crystals in their separate form, and other chemicals may be added in small amounts to modify the resultant bath, but the essential feature of the new material is the zinc phosphate of the composition and of the form and condition of crystal described.

The preferred method of producing the material has been described with considerable exactness, and any considerable variations are undesirable for reasons stated, but some changes may be made within the scope of the appended claims.

What I claim is:

1. A material consisting essentially of separate orthorhombic crystals having a composition found by quantitative analysis to be substantially 27½% ZnO, 48% $P_2O_5$ and 24½% $H_2O$.

2. A material consisting essentially of separate orthorhombic crystals the great majority of which are of a size between 16 mesh and 30 mesh and which have a composition corresponding closely to the formula $Zn(H_2PO_4)_2 2H_2O$.

3. The method of making zinc phosphate crystals which comprises forming a hot aqueous solution of zinc and phosphoric acid containing more than 14% and less than 17% zinc and from 42% to 60% acid when the zinc is dissolved, cooling the solution until crystallization begins, then stopping the cooling and stirring the solution during crystallization, and separating the resultant crystals from the mother liquor.

4. The method of making zinc phosphate crystals which comprises forming a hot aqueous solution of zinc and phosphoric acid containing about 15% zinc and 50% to 55% free phosphoric acid, cooling the solution until crystallization starts, immediately stopping the cooling when crystallization starts and stirring during crystallization, and separating the resultant crystals from the mother liquor.

5. The method of making zinc phosphate crystals which comprises forming a hot aqueous solution containing about 15% zinc and between 50% and 55% phosphoric after reaction between the zinc and phosphoric acid is complete, cooling the solution rapidly to about 45° C. continuing the cooling thereafter at a rate of the order of 4° C. per hour, until crystallization begins at from 32° C. to 34° C., then stopping the cooling and allowing the heat of crystallization to raise the temperature of the solution, stirring the solution during crystallization, after the temperature of the solution becomes stationary cooling once more and centrifuging, heating the mother liquor and adding thereto sufficient zinc, phosphoric and water to restore it to the proportions indicated above, and repeating the process.

VAN M. DARSEY.